Feb. 26, 1929. 1,703,178

C. SIFTON, JR

VARIABLE SPEED TRANSMISSION

Filed Nov. 9, 1927

INVENTOR
C. SIFTON, Jr

ATTORNEYS

Patented Feb. 26, 1929.

1,703,178

UNITED STATES PATENT OFFICE.

CLIFFORD SIFTON, JR., OF TORONTO, ONTARIO, CANADA.

VARIABLE-SPEED TRANSMISSION.

REISSUED

Application filed November 9, 1927. Serial No. 232,133.

My invention relates to improvements in variable speed transmissions, and the object of the invention is to devise a compact easily controlled transmission mechanism by arranging such mechanism concentrically around axially aligned driving and driven members, to devise a transmission in which the driving ratios may be gradually and smoothly varied between the maximum and minimum, in which the direct drive is effected without internal friction in the connecting mechanism, and therefore the loss of energy and wear between the parts reduced and the life of the parts increased, in which under direct drive conditions there is no pressure exerted from an outside source, and in which during the operation of changing speed the pressure controlling such changes is entirely under the control of the operator so that any amount of pressure and consequent speed change may be attained and held, and it consists essentially of the arrangement and construction of parts as hereinafter more particularly explained.

In the drawing like characters of reference indicate corresponding parts in each figure.

Figure 1:
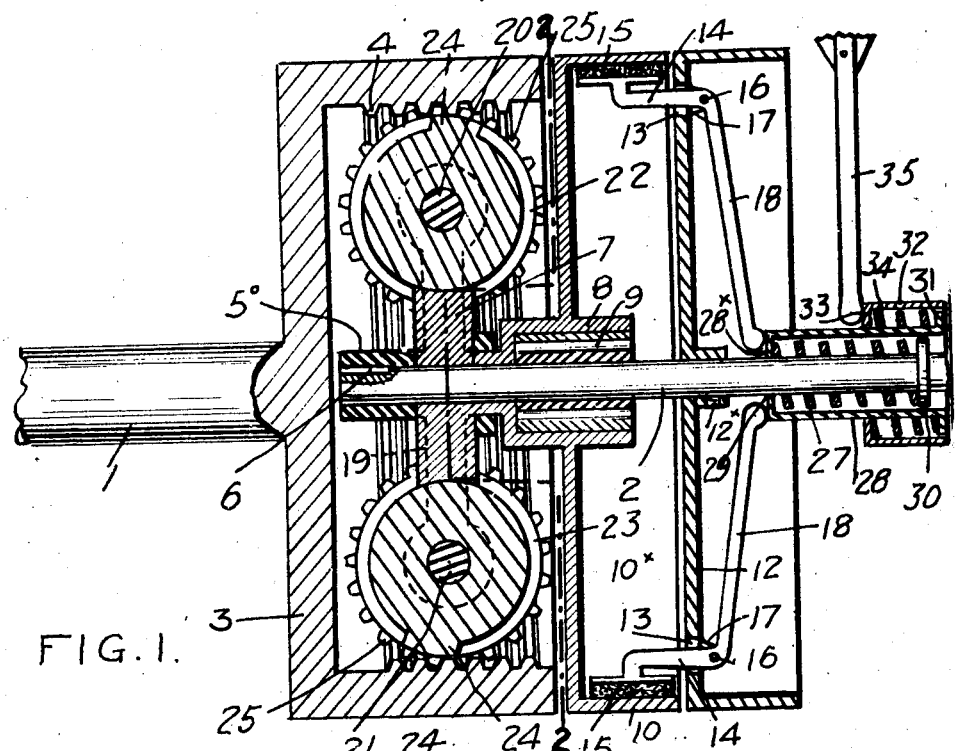
Fig. 1 is a longitudinal sectional view through my transmission mechanism.
Figure 2:
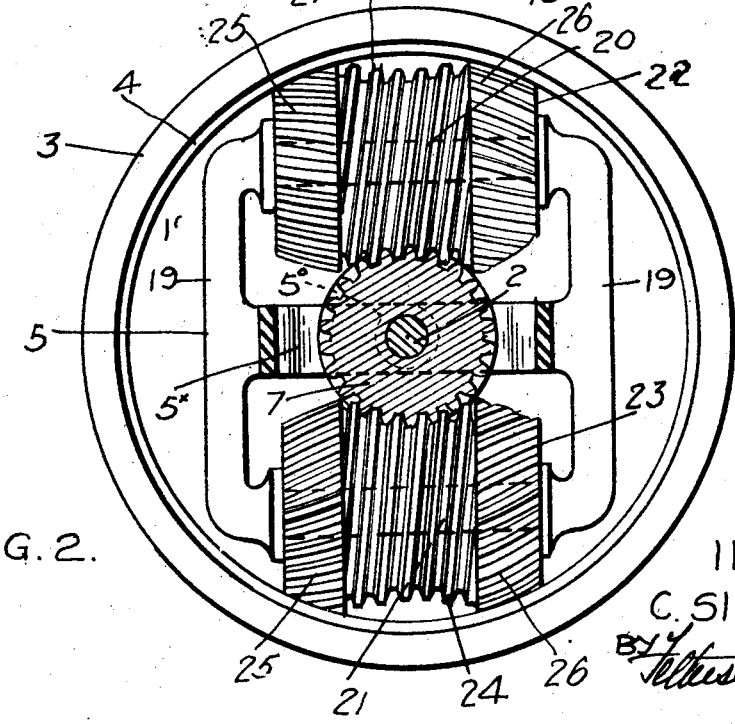
Fig. 2 is a transverse sectional view on line 2—2 Figure 1.

1 indicates the drive shaft and 2 the driven shaft, the drive and driven shafts being in axial alignment one with the other. 3 is a cylindrical member mounted concentrically on the end of the drive shaft adjacent the opposing end of the driven shaft and provided with an internal worm 4. 5 is a spider provided with a diametrically extending portion $5^x$ provided with a bearing portion $5^o$, see Figure 1, in which the driven shaft is keyed as indicated at 6.

The portion $5^x$ is formed into a frame between the members of which is freely mounted a worm gear 7 formed integral with the bearing sleeve member 8 which is preferably provided with roller bearings 9 extending around the driven shaft 2 so as to revolve around the same.

10 is a cylindrical member, the rim $10^x$ of which provides an internal annular friction surface to form one member of a friction clutch device. 12 is a supporting member secured to the driven shaft as indicated at $12^x$ and provided with orifices 13 through which clutch arms 14 extend provided with friction shoes 15 bearing against the inner face of the friction surface $10^x$. The arms 14 are pivotally mounted as indicated at 16 upon brackets 17 carried by the supporting member 12, such arms being also provided with inwardly extending outwardly inclined portions 18 terminating at their inner ends in proximity to the driven shaft 2, the arms being arranged concentrically around such driven shaft.

The portion $5^x$ is provided at its ends with transverse portions 19 extending to each side of the portion $5^x$ and connected together at their ends by transverse bearing portions 20 and 21 on which are mounted worm members 22 and 23, each worm member being provided with a worm portion 24 extending circumferentially around the same so as to engage with the worm gear 7 at diametrically opposite points and at their ends provided with substantially longitudinally extending worm portions 25 and 26 engaging the internal worm 4 of the member 3.

It will be seen that when the friction shoes 15 engage the friction surface $10^x$ so as to hold the member 10 stationary and consequently the worm gear 7, and a driving force is exerted on the drive shaft 1 to rotate such drive shaft and the member 3, the worm 4 engaging the worms 25 and 26, will rotate the worm gear members 22 and in consequence, when the worm gear 7 is held stationary by the load, will cause such worm gear members 22 to travel circumferentially around the worm gear 7 and thereby carry the frame formed by the members 5, 19, 20 and 21 in a corresponding direction and therefore drive the driven shaft 2 through its keyed connection 6 thereby producing a one to one ratio between the driving and driven shafts.

The shoes 15 may be held in engagement with the friction surface $10^x$ either by means of the centrifugal force exerted on the shoes or by spring pressure, such as indicated at 27 against the inner ends of the members 18 of the arms 14.

In order to vary the driving ratios between the driving and driven members I vary the spring pressure exerted by the spring 27 upon the shoes.

28 is a cylindrical housing containing the spring 27 and provided with a closed end 28× through an opening 29 in which the driven shaft 2 extends. One end of the spring 27 bears against the collar 30 and the opposite end of the spring 27 against the end 28× of the housing 28. The housing 28 is provided with an out-turned annular flange 31. 32 is an outer sleeve surrounding the sleeve 27 and the flange 31 and provided with an inner closed end 33 through which the sleeve 21 extends. Between the closed end 33 and the spring 31 is inserted a pressure spring 34 opposing the spring 27. 35 is a controlling lever bearing against the inner end of the sleeve 32.

It will thus be seen that as the operating lever 35 is swung against the end of the sleeve 32 the spring 34 will be compressed so as to gradually build up a pressure opposing the pressure of the spring 27 and will therefore very gradually and slowly relieve the pressure of the spring 27 against the arm members 18 and thereby very slowly reduce the pressure of the friction shoes 15 against the internal friction surface 10× and thereby allow for slippage of the member 10 in proportion to the amount of the reduced pressure of the shoes 15 against the friction surface 10×, permitting the worm gear 7 to also proportionately revolve and thereby reduce the driving effect of the worm gear members 22 and their travel around such worm gear so as to reduce the transmitting force carried therethrough from the drive to the driven shaft.

It will thus be seen that as the pressure of the shoes 15 against the friction surface 10× is reduced the drive will be increased through to the member 10× and the drive through the frame comprising the members 5×, 19 and 20 will be reduced by the decreasing tendency of the gear members 22 to travel around the worm gear 7 owing to its increase in rotation, the leverage between the worm members 22 and worm gear 7 being reduced by the release of the worm gear 7 to travel more or less freely around the driven shaft and consequently the speed of the frame 5 and the driven shaft to which it is keyed is reduced.

It will therefore be seen from this description that when there is a one to one ratio drive between the drive and driven shafts, or in other words a direct drive of the driving mechanism, they will be locked together so that there will be no relative motion and therefore all friction will be eliminated. At the same time when the variable transmission is effected, the freeing of the worm gear 7 permitting its rotation, will also reduce the friction between it and the worm members 22 and the worm 4.

It will therefore be seen that by my construction the driving ratios may be gradually, evenly and smoothly reduced or increased to any extent desired so as to provide any gear ratio desired without any jumping from one definite gear ratio to another, in which all the parts are arranged concentrically around the axially aligned drive and driven shafts, and therefore providing a device which is compact, balanced and readily controlled by the operator, in which under direct drive conditions the parts of the device are held in driving connection without pressure from any outside source, and in which such pressure can be readily controlled by the operator to produce any driving ratio desired.

It may also be pointed out that in the planetary gears the worm threads of such gears may be reversed so as to reverse the rotation of the worm gear 7 to revolve in an opposite direction to the direction of rotation of the driving shaft.

What I claim as my invention is:—

1. In a variable transmission mechanism, the combination with the driving and a driven shaft, of a planetary gear system having a gear connected to the driving shaft and a gear mounted freely upon the driven shaft, a frame secured to the driven shaft in which the planetary gears are mounted to engage the shaft gears of the system, a friction clutch member connected to the centre gear to revolve in unison therewith, a supporting member carried by the driven shaft, an opposing clutch member mounted thereon, a cylindrical sleeve mounted upon the driven shaft and bearing against the opposing clutch members to force them into engagement, an abutment on the driven shaft, a spring interposed between the abutment and the inner ends of the sleeve, an abutment carried by the sleeve, an outer sleeve surrounding the aforesaid sleeve, a spring inserted between the abutment of such sleeve and the end of the outer sleeve, and a lever adapted to engage the outer sleeve to compress the last mentioned spring.

2. In a variable transmission mechanism, the combination with the driving shaft and driven shaft, of a cylindrical member secured to the driven shaft and provided with an internal worm, a worm gear mounted upon the driven shaft, a frame secured to the driven shaft and interposed planetary gears mounted in the frame transversely of the driven shaft and having a centre worm thread portion engaging the worm gear of the driven shaft, and end worm gear portions engaging the internal thread of the aforesaid cylindrical member, a friction clutch device carried by the driven member and comprising a cylindrical clutch member connected to the aforesaid worm gear mounted on the driven shaft and having a friction surface, shoes coacting with the surface, and means for varying the pressure of the shoes against such surface.

3. The combination with two longitudinally aligned shafts, an internal worm gear carried by one shaft, and the external worm gear carried by the other shaft, and a frame secured to the shaft carrying the external worm gear, of interposed worm gears revolvably mounted in the frame with their axis at right angles to the axis of the aforesaid gears and having a central worm section engaging the external worm gear and end sections engaging the internal worm gear, and a friction clutch device for controlling the rotation of the external worm gear.

CLIFFORD SIFTON, Jr.